US012716788B2

(12) United States Patent
Maruyama et al.

(10) Patent No.: US 12,716,788 B2
(45) Date of Patent: Aug. 25, 2026

(54) TEMPERATURE CALIBRATION METHOD

(71) Applicants: SEMITEC Corporation, Tokyo (JP); National Institute of Technology, Tokyo (JP); HIROSAKI UNIVERSITY, Aomori (JP)

(72) Inventors: Shigenao Maruyama, Aomori (JP); Takahiro Okabe, Aomori (JP); Yuya Iseki, Aomori (JP); Takashi Nonaka, Aomori (JP); Takuma Kogawa, Aomori (JP); Yasushi Hosokawa, Aomori (JP); Manabu Orito, Tokyo (JP)

(73) Assignees: SEMITEC Corporation, Tokyo (JP); National Institute of Technology, Tokyo (JP); HIROSAKI UNIVERSITY, Aomori (JP)

( * ) Notice: Subject to any disclaimer, the term of this patent is extended or adjusted under 35 U.S.C. 154(b) by 380 days.

(21) Appl. No.: 18/556,679

(22) PCT Filed: Mar. 24, 2022

(86) PCT No.: PCT/JP2022/013936
§ 371 (c)(1),
(2) Date: Oct. 23, 2023

(87) PCT Pub. No.: WO2022/244464
PCT Pub. Date: Nov. 24, 2022

(65) Prior Publication Data

US 2024/0201030 A1 Jun. 20, 2024

(30) Foreign Application Priority Data

May 21, 2021 (JP) ................................ 2021-086036

(51) Int. Cl.
*G01K 15/00* (2006.01)

(52) U.S. Cl.
CPC ................................ *G01K 15/005* (2013.01)

(58) Field of Classification Search
CPC ..... G01K 15/005; G01K 15/002; G01K 15/00
See application file for complete search history.

(56) References Cited

U.S. PATENT DOCUMENTS 5,326,170 A * 7/1994 Moslehi .............. G01K 15/005 374/2
10,018,520 B2 * 7/2018 Ostermeyer ....... G01N 21/4133
(Continued)

FOREIGN PATENT DOCUMENTS

CN 1349609 A * 5/2002 ............ G01K 15/00
CN 106017739 10/2016
(Continued)

OTHER PUBLICATIONS

"International Search Report (Form PCT/ISA/210) of PCT/JP2022/013936", mailed on Jun. 14, 2022, with English translation thereof, pp. 1-4.

(Continued)

*Primary Examiner* — Laura Martin Sweeney
*Assistant Examiner* — Julia Fitzpatrick
(74) *Attorney, Agent, or Firm* — JCIPRNET

(57) ABSTRACT

Provided is a temperature calibration method that makes it possible to efficiently calibrate temperature in a short time and enhance temperature calibration accuracy. This temperature calibration method uses a temperature calibration device (10) comprising a temperature calibration block (2) having formed therein a placement part (25) for a reference temperature sensor (5) and a temperature sensor (T) to be calibrated. In this temperature calibration method, a temperature state in a gradual temperature variation transition process of the temperature calibration block (2) is taken to be a calibration temperature. The temperature calibration
(Continued)

device (10) comprises: a vacuum-insulated container (1) comprising a vacuum region (Va) surrounding the temperature calibration block (2) and an accommodation part for accommodating the temperature calibration block (2); and a Peltier module (3) that is thermally coupled to the temperature calibration block (2).

10 Claims, 12 Drawing Sheets

(56) References Cited

U.S. PATENT DOCUMENTS

| | | | | |
|---|---|---|---|---|
| 2011/0125444 | A1* | 5/2011 | Topham | G01K 15/002 374/2 |
| 2021/0123822 | A1 | 4/2021 | Maunumäki et al. | |

FOREIGN PATENT DOCUMENTS

| | | | | | |
|---|---|---|---|---|---|
| CN | 110487445 | A | * | 11/2019 | G01K 15/005 |
| EP | 3296710 | B1 | * | 10/2019 | G01K 15/00 |
| JP | H0418329 | | | 2/1992 | |
| JP | H07198500 | A | * | 8/1995 | |
| JP | 2000304627 | | | 11/2000 | |
| JP | 2005147935 | | | 6/2005 | |
| JP | 2006078039 | | | 3/2006 | |
| JP | 2007127487 | | | 5/2007 | |
| JP | 2007232651 | | | 9/2007 | |
| JP | 2007248277 | | | 9/2007 | |
| JP | 2010175344 | A | * | 8/2010 | |
| JP | 4714850 | | | 6/2011 | |
| JP | 2012013496 | | | 1/2012 | |
| JP | 5123867 | B2 | * | 1/2013 | |
| JP | 2016191566 | | | 11/2016 | |
| KR | 20080006687 | A | * | 1/2008 | G01K 15/002 |

OTHER PUBLICATIONS

"Office Action of China Counterpart Application", issued on Apr. 29, 2026, with English translation thereof, pp. 1-12.

* cited by examiner

TEMPERATURE CALIBRATION METHOD

CROSS-REFERENCE TO RELATED APPLICATION

This application is a 371 application of the International PCT application serial no. PCT/JP2022/013936, filed on Mar. 24, 2022, which claims the priority benefits of Japan Patent Application No. 2021-086036, filed on May 21, 2021. The entirety of each of the above-mentioned patent applications is hereby incorporated by reference herein and made a part of this specification.

TECHNICAL FIELD

The invention relates to a temperature calibration method performed by a temperature calibration device.

RELATED ART

Manufacturing processes in most industrial fields, including safety-sensitive fields such as manufacturing of food or drug, require precise control of temperature. In addition, the accuracy of temperature measurement is important in quality management systems, which can affect final product quality.

Therefore, it is necessary to calibrate temperature sensors used to control and measure temperature.

Conventionally, a temperature calibration device has been proposed that compares and calibrates temperature by using a reference thermometer as a temperature sensor and a thermometer to be calibrated. Such conventional temperature calibration device calibrates the temperature of the thermometer to be calibrated by arranging the reference thermometer and the thermometer to be calibrated in a temperature calibration block maintained at a constant temperature in thermal equilibrium.

CITATION LIST

Patent Literature

[Patent Document 1] Japanese Laid-open No. 2006-78039

[Patent Document 2] Japanese Laid-open No. 2007-232651

[Patent Document 3] Japanese Laid-open No. 2016-191566

[Patent Document 4] Japanese Laid-open No. H04-18329

[Patent Document 5] Japanese Patent No. 4714850

[Patent Document 6] Japanese Laid-open No. 2005-147935

SUMMARY OF INVENTION

Technical Problem

However, in the conventional temperature calibration method as mentioned above, as a part for maintaining the temperature calibration block at a constant temperature, liquefied gas, a refrigerator, an electric heater, etc., is used, and it generally requires a long time to reach thermal equilibrium inside the temperature calibration block. In addition, in order to maintain a constant temperature, the configuration of the device may be complicated. Moreover, since uniform heating that maintains the temperature calibration block at a constant and uniform temperature is difficult, the accuracy of temperature calibration may not be sufficient, and temperature calibration is not performed efficiently.

An objective of the embodiments of the invention is to provide a temperature calibration method, with which multi-point temperature calibration can be performed efficiently within a short time, and it is possible to enhance the calibration accuracy of a calibration temperature range through multi-point temperature calibration.

Solution to Problem

A temperature calibration method according to an embodiment is performed by a temperature calibration device comprising a temperature calibration block formed with a placement part for a reference temperature sensor and a temperature sensor to be calibrated. The temperature calibration method includes: setting a temperature state in a gradual temperature variation transition process of the temperature calibration block as a calibration temperature.

According to the temperature calibration method of the embodiment, temperature calibration can be efficiently performed, and it is possible to enhance temperature calibration accuracy.

Effects of Invention

According to the embodiments of the invention, a temperature calibration method that makes it possible to efficiently calibrate temperature in a short time and enhance temperature calibration accuracy can be provided.

DESCRIPTION OF EMBODIMENTS

Figure 1:
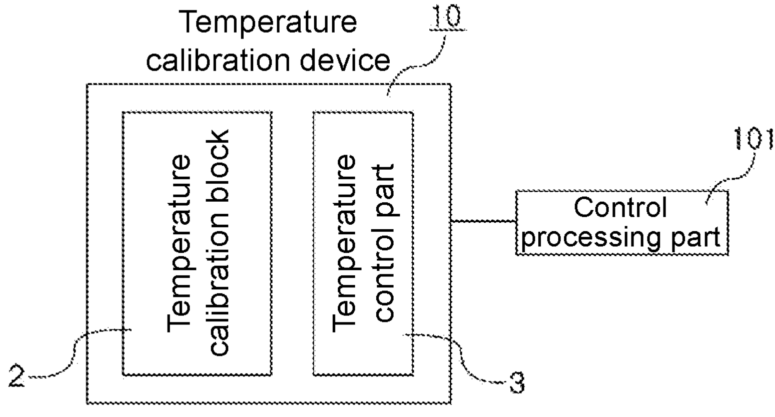
FIG. 1 is a diagram illustrating a configuration of a temperature calibration device according to an embodiment of the invention.
Figure 2A:
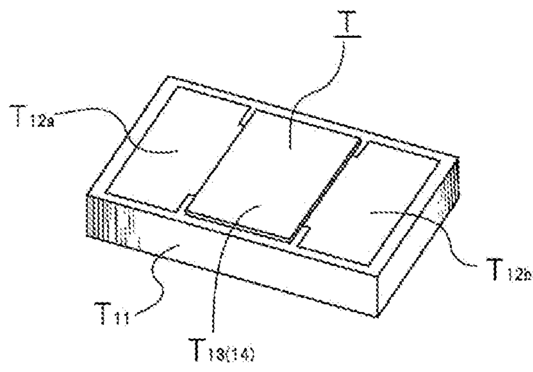
FIG. 2A is a perspective view illustrating a temperature sensor to be calibrated.
Figure 2B:
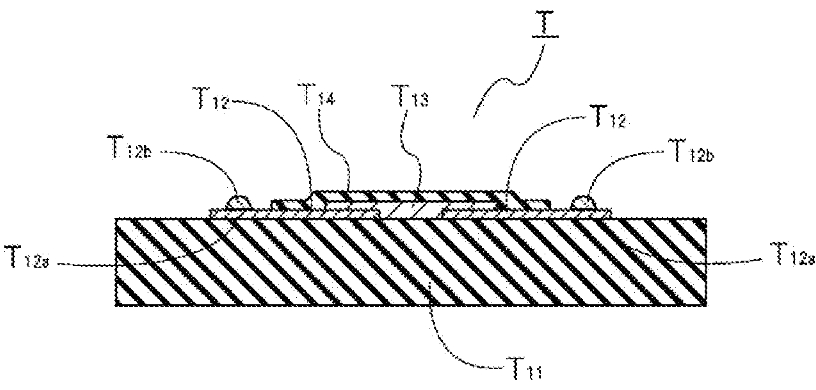
FIG. 2B is a cross-sectional view illustrating the temperature sensor to be calibrated.
Figure 3:
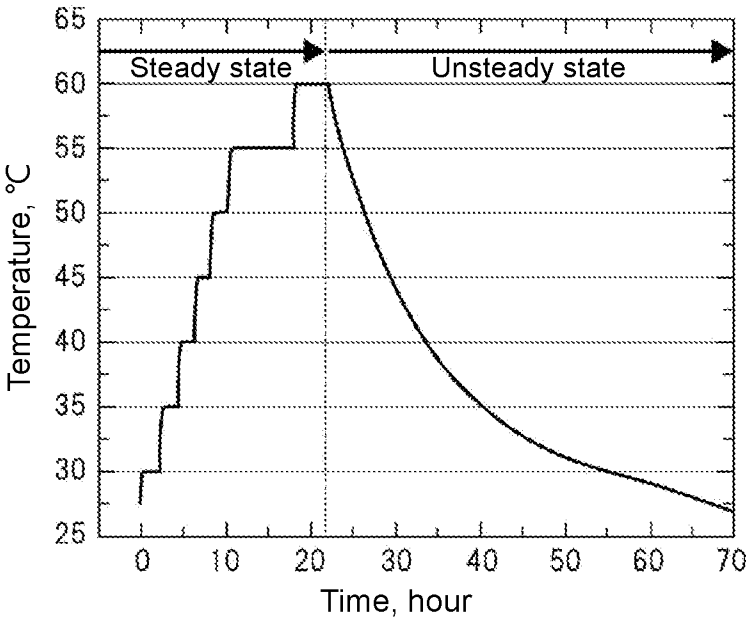
FIG. 3 is a graph illustrating the concept of a temperature calibration method according to an embodiment of the invention in the comparison with the conventional art.
Figure 4:
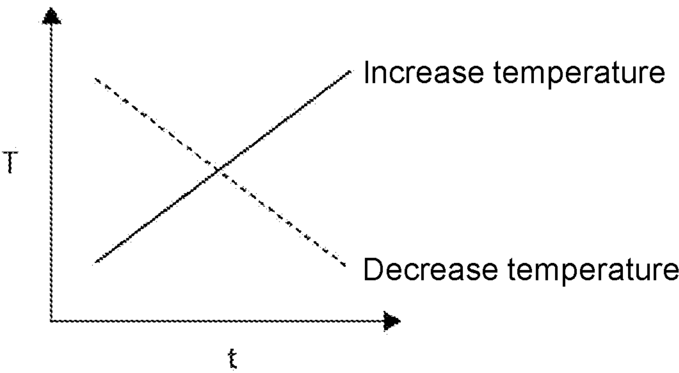
FIG. 4 is a graph illustrating the concept of the same temperature calibration method.
Figure 5:
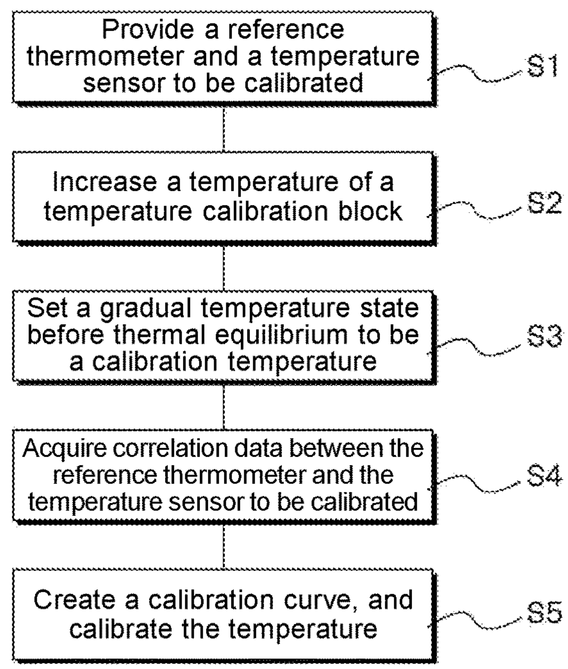
FIG. 5 is a flowchart illustrating the same temperature calibration method.
Figure 6:
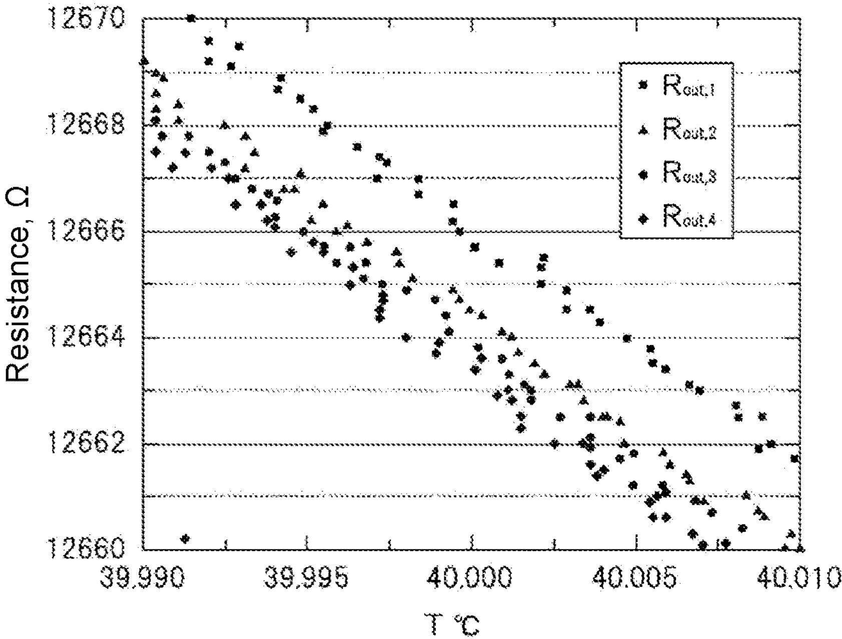
FIG. 6 is a graph illustrating temperature calibration data of a temperature sensor to be calibrated in the same temperature calibration method.

In the following, a temperature calibration method according to an embodiment of the invention is described with reference to FIGS. 1 to 6. FIG. 1 is a diagram illustrating a configuration of a temperature calibration device. FIG. 2A and FIG. 2B are respectively a perspective view and a cross-sectional view illustrating a temperature sensor to be calibrated. FIGS. 3 and 4 are graphs illustrating the concept of the temperature calibration method. FIG. 5 is a flowchart illustrating the temperature calibration method. FIG. 6 is a graph illustrating temperature calibration data of the temperature sensor to be calibrated. In FIGS. 2A and 2B, in order to make the respective parts recognizable, the scales of the respective parts are changed as appropriate.

The temperature calibration method according to the embodiment is a method that compares and calibrates temperature by using a reference thermometer as a reference temperature sensor and a thermistor as a temperature sensor to be calibrated.

As shown in FIG. 1, a temperature calibration device 10 includes a temperature calibration block 2 and a temperature control part 3. In addition, the temperature calibration device 10 is connected with a control processing part 101.

The temperature calibration block 2 is formed of a material having a high thermal conductivity and a favorable thermal conductive property, and is formed with a placement part for the reference thermometer as the reference temperature sensor and the thermistor as the temperature sensor to be calibrated are arranged, in which the reference thermometer and the thermistor are placed.

The temperature control part 3 is thermally coupled to the temperature calibration block 2, and controls the temperature of the temperature calibration block 2. For example, a Peltier module or a heater may be used.

The control processing part 101 has an input part and an output part, monitors and controls the temperature of the temperature calibration block 2, or acquires data of the reference thermometer and the thermistor to control the entire temperature calibration device 10.

The temperature sensor to be calibrated as shown in FIGS. 2A and 2B is a thin-film thermistor T. The thin-film thermistor T includes an element substrate $T_{11}$, a conductive layer $T_{12}$ formed on the substrate $T_{11}$, a thin-film element layer $T_{13}$, and a protective insulation layer $T_{14}$.

The element substrate $T^{11}$ is formed in a substantially elongated rectangular shape, and formed of an insulating alumina material. However, materials such as ceramics, such as aluminum nitride, zirconia, etc., or semiconductors, such as silicon, germanium, may also be used as the material for forming the substrate $T_{11}$. The substrate T 11 is very thin, and may be formed with a thickness dimension of 50 μm to 150 μm, and may also be formed with a thickness dimension of 100 μm or less.

By using such thin substrate $T_{11}$ in the thin-film thermistor, it is possible to realize a temperature sensing element having a small heat capacity, high sensitivity, and excellent thermal response.

The conductive layer $T_{12}$ forms a wiring pattern, and is formed on the substrate $T_{11}$. The conductive layer $T_{12}$ is formed by forming a metal thin film by performing a sputtering process. In addition, at two ends of the substrate $T_{11}$, a pair of electrode parts $T_{12}$a electrically connected with the conductive layer $T_{12}$ and integral with the conductive layer $T_{12}$ are formed.

The thin-film element layer $T_{13}$ is a thermistor composition, and is formed of an oxide semiconductor having a negative temperature coefficient. The thin-film element layer $T_{13}$ is formed as a film on the conductive layer $T_{12}$ by performing a sputtering process, and is electrically connected with the conductive layer $T_{12}$. The thin-film element layer may also be formed of an oxide semiconductor having a positive temperature coefficient. The protective insulation layer $T_{14}$ is formed to cover the thin-film element layer $T_{13}$ and the conductive layer $T_{12}$. The protective insulation layer $T_{14}$ is a protective glass layer formed of borosilicate glass. In addition, the electrode parts $T_{12a}$ are bonded and electrically connected with metallic lead wires $T_{12b}$ through welding.

In the following, the concept of a temperature calibration method is described with reference to FIGS. 3 and 4.

In FIG. 3, the horizontal axis represents time (h), and the vertical axis represents the temperature (° C.) of the temperature calibration block. In addition, in the figures, the left side illustrates the conventional temperature calibration method, and the right side illustrates the temperature calibration method according to the embodiment.

Firstly, the conventional temperature calibration method is a steady-state comparison method performing calibration in a state in which the heat calibration block is in thermal equilibrium. Specifically, the temperature of the temperature calibration block is set, for example, to 30° C., 35° C., 40° C., etc., and standbys until a state of a constant temperature that is set, that is, until thermal equilibrium to perform calibration. Therefore, in the steady-state comparison method, in the case where calibration is performed at seven points from 30° C. to 60° C. in an increment of 5° C., about 20 hours are required. Since such multi-point calibration is time-consuming, in conventional temperature calibration, calibration is generally performed at 2 to 6 points.

The temperature calibration method according to the embodiment is an unsteady state comparison method, which performs calibration in a temperature state in a gradual temperature variation transition process, without having the temperature calibration block reach thermal equilibrium. Therefore, it is not required to standby until the temperature of the temperature calibration block reaches thermal equilibrium, and it is possible to gradually control the temperature calibration block to different calibration temperatures to perform calibration within a short time. In the figure, a temperature curve of a gradual temperature variation transition process in the case where the temperature calibration block is cooled naturally is shown. By performing calibration in the temperature state in the gradual temperature variation transition process, multi-point calibration of 10 points or more can be realized easily.

The time during which the temperature curve of the figure drops from 60° C. to 30° C., which is the temperature state in the gradual temperature variation transition process of the invention, is about 30 hours, in which the temperature changes 1° C. per hour. It is confirmed that, while not in thermal equilibrium, for a temperature sensor having a small thermal time constant and performs calibration, it can be viewed as a thermally steady state equivalent to thermal equilibrium.

In FIG. 4, the horizontal axis represents time, and the vertical axis represents temperature (° C.) of the temperature calibration block, and the transition process of the gradual temperature variation of the temperature calibration block, that is, the temperature transition process in the case where the temperature increases or decreases is shown. The temperature calibration method according to the embodiment performs calibration by using the temperature of such transition process in the case of increasing or decreasing temperature as the calibration temperature. Although the temperature increasing state or the temperature decreasing state of the temperature calibration block may be controlled by the temperature control part 3, the temperature may also be lowered through natural cooling.

In the following, an example of the temperature calibration method is described with reference to FIG. 5.

The reference thermometer and a thin-film thermistor T, as the temperature sensor to be calibrated, are placed in the placement part of the temperature calibration block 2 (S1). The temperature of the temperature calibration block 2 is increased to a predetermined temperature through setting of the temperature control part 3 (S2). The temperature of the temperature calibration block 2 is increased to the predetermined temperature that is set. The temperature state during the gradual temperature increasing transition process before the temperature calibration block 2 reaches the predetermined temperature (thermal equilibrium) is set as a calibration temperature. The calibration temperature allows calibration by capturing multiple temperature points (multi-point) (S3). This is because the thin-film thermistor T has a small thermal time constant, excellent thermal response, and a high resolution. That is, it is possible to perform calibration at multiple temperature points corresponding to the resolution.

Then, data of the relationship between the reference thermometer and the thin-film thermistor T of the temperature sensor to be calibrated, that is, the correlation relationship between the temperature of the reference thermometer and the resistance value of the thin-film thermistor is acquired (S4), and a calibration curve between the temperature of the reference thermometer and the resistance value of the thin-film thermistor T of the temperature sensor to be calibrated is generated, and temperature calibration is performed (S5).

In the example, the case where the temperature calibration block is set in the temperature increasing state through setting of the temperature control part 3 is described. However, it goes without saying that the method is also applicable to the case where the temperature calibration block 2 is set in the temperature decreasing state through setting of the temperature control part 3.

Then, an example of the calibration data in the case where multiple temperature points are captured and calibration is performed is described with reference to FIG. 6. FIG. 6 illustrates detailed data round 40° C. of the temperature calibration block (reference thermometer). In FIG. 6, the horizontal axis represents temperature (° C.), and the vertical axis represents resistance value (Ω) of the thin-film thermistor T. The calibration data indicate the result of four repetitive tests on the thin-film thermistor T. The calibration data is the calibration data of 39.99° C. to 40.01° C., indicating that calibration at 40 temperature points is possible within such temperature range. In the results of the four repetitive tests, it is known that there is only a slight difference in each comparison.

In the temperature calibration method using the unsteady comparison method according to the embodiment, the temperature variation of 1° C. in one hour is possible through the control of the temperature control part 3, and, in such case, calibration at 4000 temperature points is possible. Therefore, it is possible to capture multiple temperature points to perform calibration continuously, and the calibration accuracy can be increased significantly. In addition, for example, in an electronic body thermometer using a thermistor, it is possible to set the temperature range as 32° C. to 42° C. and perform calibration at 40000 temperature points.

According to the embodiment as described above, the calibration of temperature can be efficiently performed within a short time, and it is possible to enhance temperature calibration accuracy.

In addition, in the case where a thermistor as the temperature sensor to be calibrated is provided to the customer, for example, by providing alongside temperature calibration data of at least 20 or more temperature points to provide the thermistor as a thermistor with temperature calibration data, it is possible to make contribution to the effective use of the customer.

Figure 7:
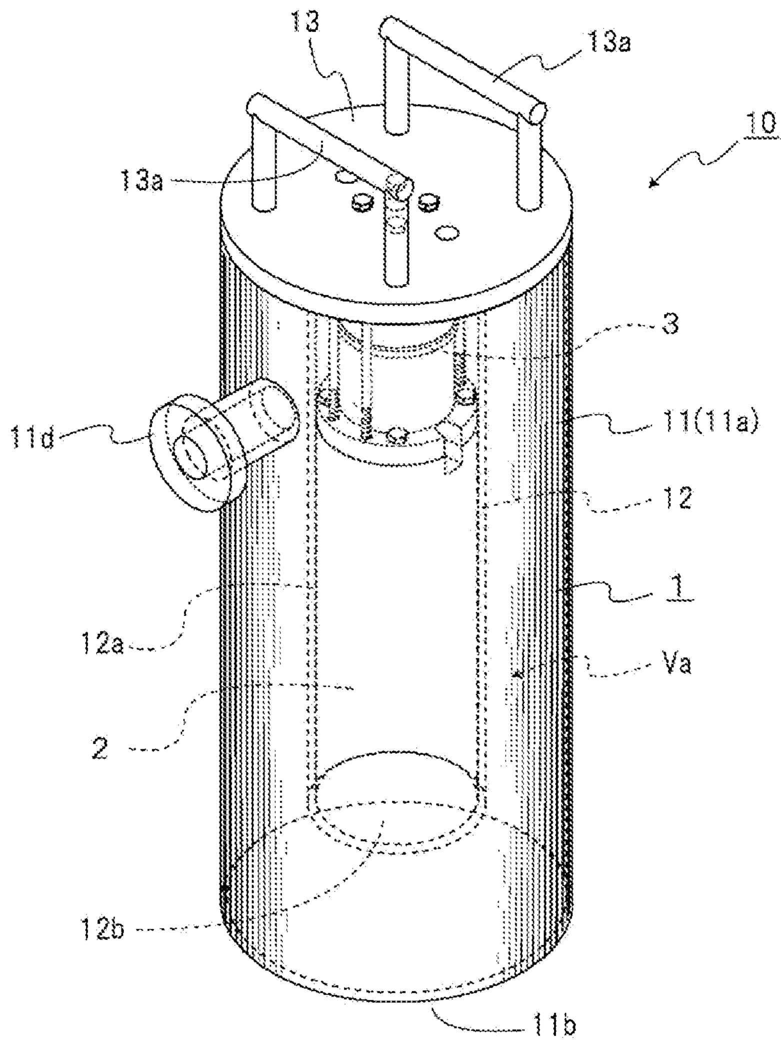
FIG. 7 is a perspective view illustrating the temperature calibration device according to the embodiment of the invention.
Figure 8:
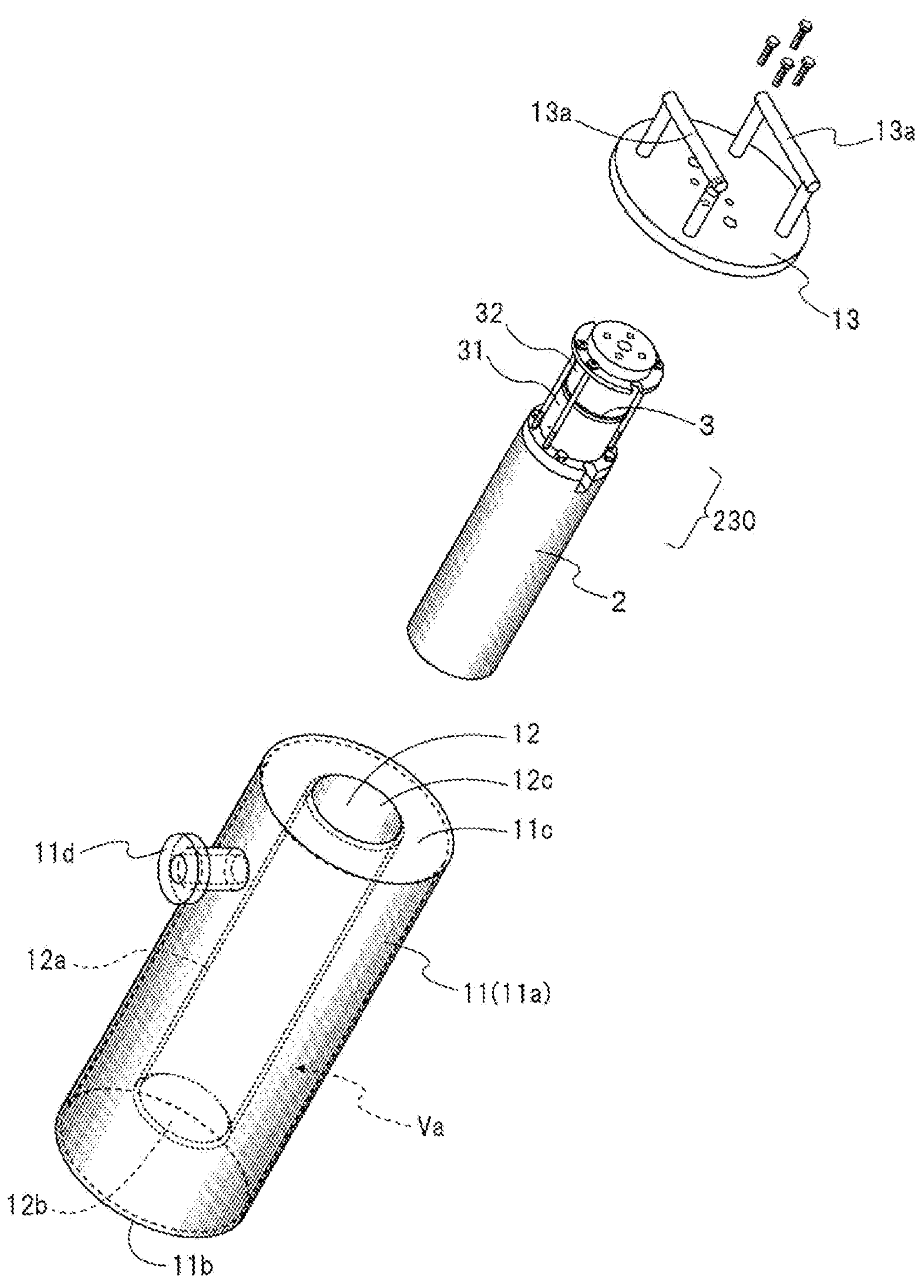
FIG. 8 is an exploded perspective view illustrating the same temperature calibration device.
Figure 9:
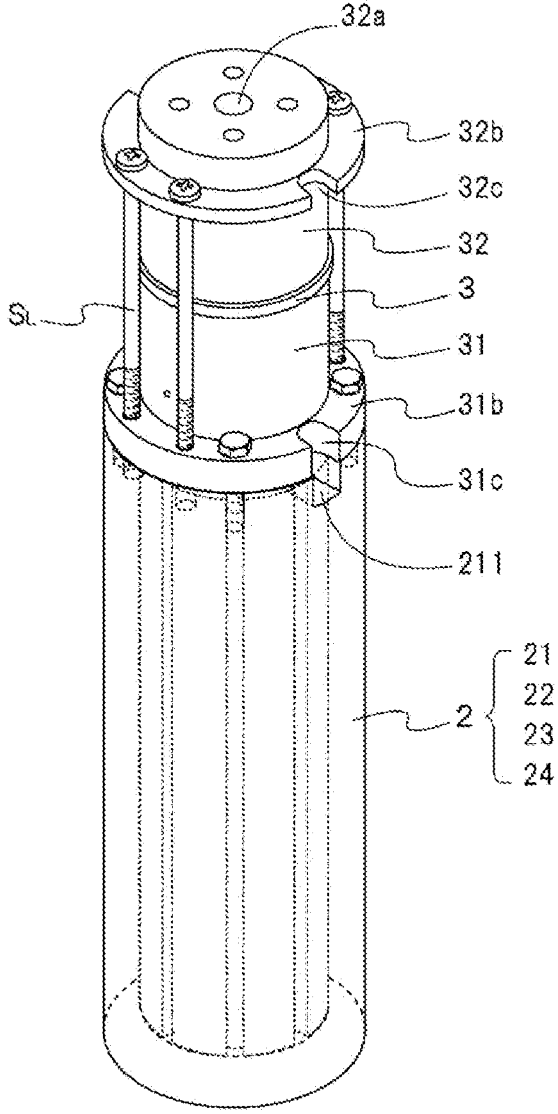
FIG. 9 is a perspective view illustrating that a temperature calibration block and a Peltier module are removed in the same temperature calibration device.
Figure 10:
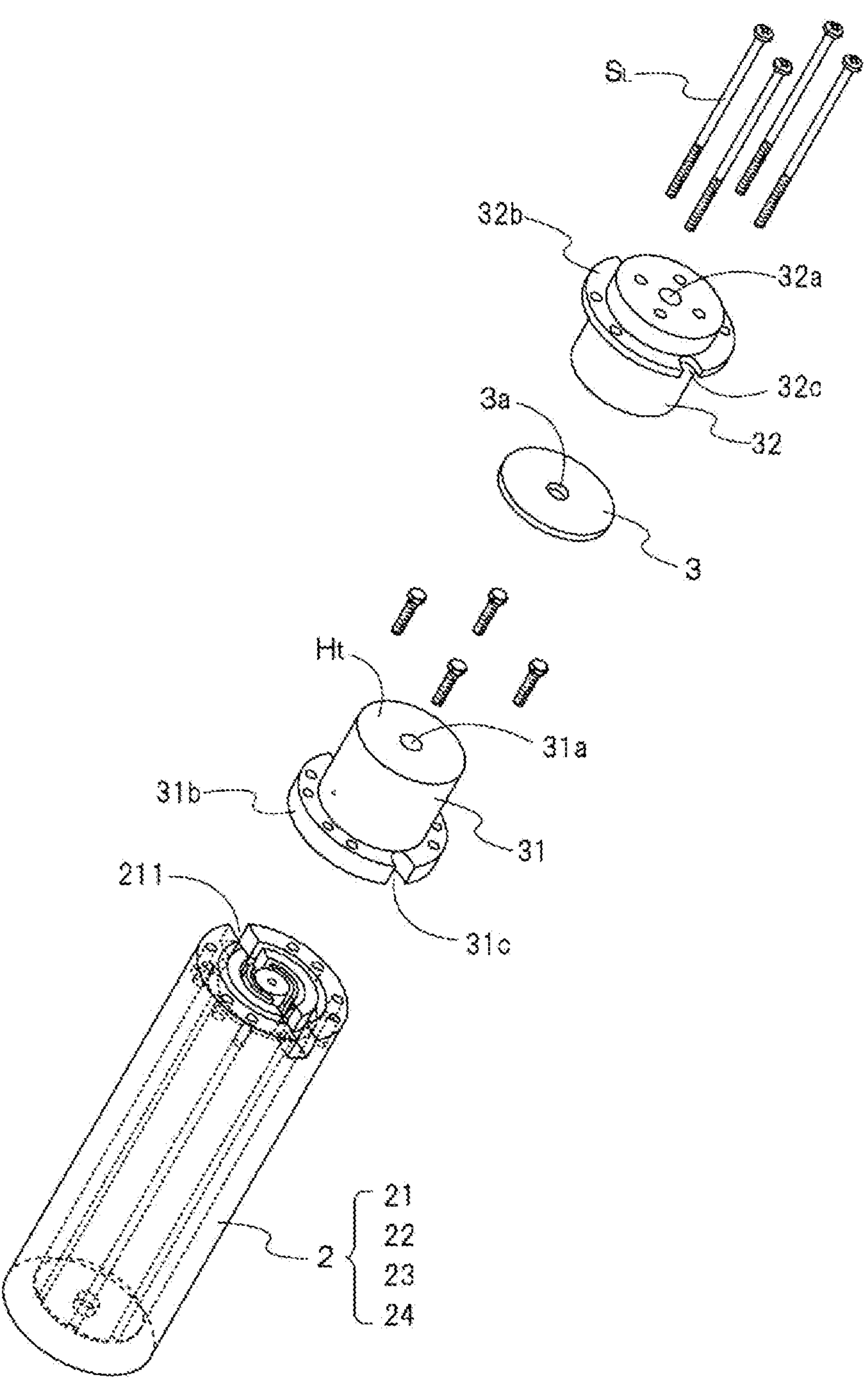
FIG. 10 is an exploded perspective view illustrating that the temperature calibration block and the Peltier module are removed in the same temperature calibration device.
Figure 11:
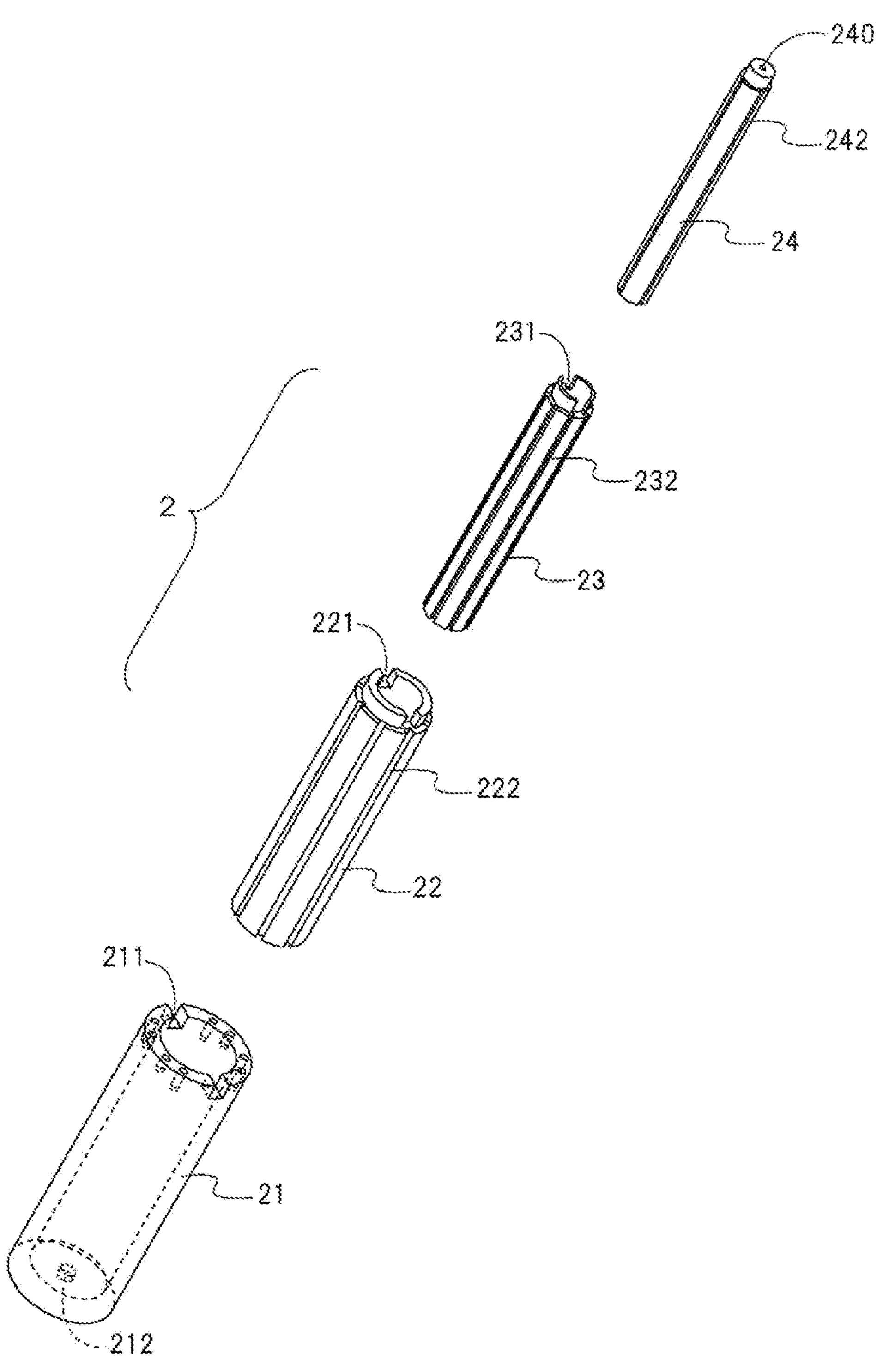
FIG. 11 is an exploded perspective view illustrating the temperature calibration block in the same temperature calibration device.
Figure 12A:
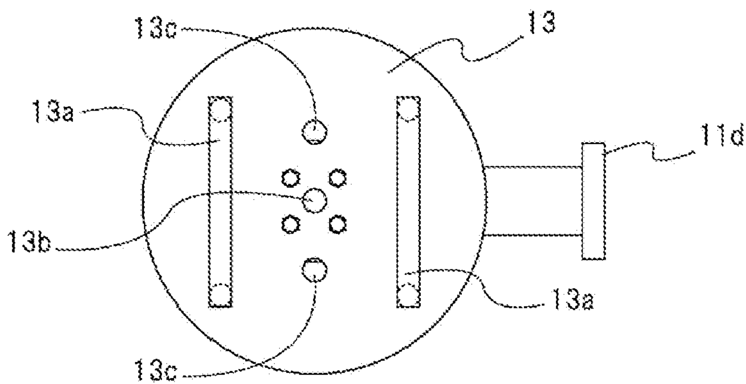
FIG. 12A is a top view illustrating the same temperature calibration device.
Figure 12B:
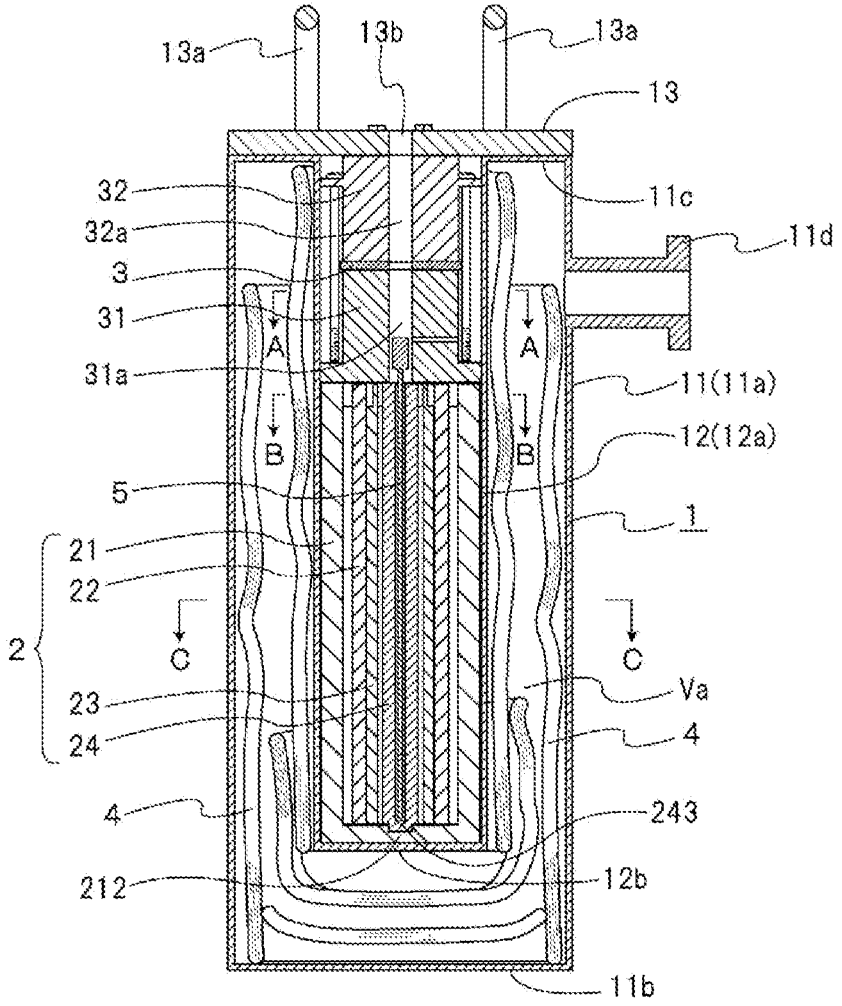
FIG. 12B is a longitudinal cross-sectional view illustrating the same temperature calibration device.
Figure 13A:
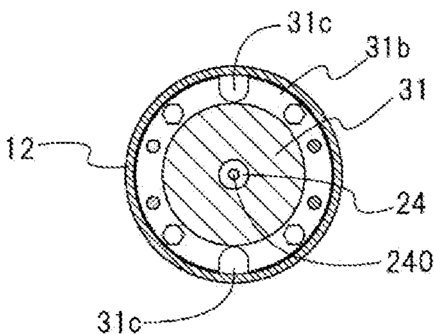
FIG. 13A is a cross-sectional view taken along a line A-A in FIG. 12B.
Figure 13B:
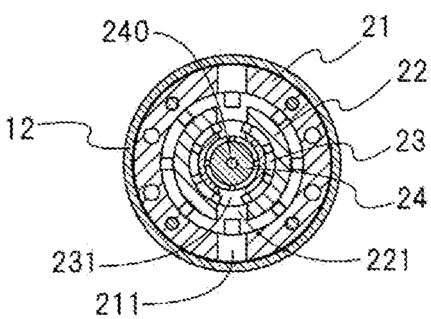
FIG. 13B is a cross-sectional view taken along a line B-B in FIG. 12B.
Figure 13C:
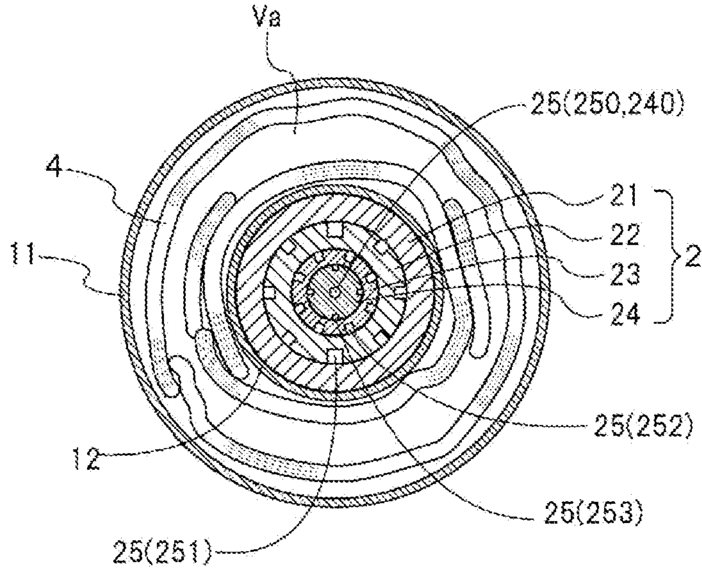
FIG. 13C is a cross-sectional view taken along a line C-C in FIG. 12B.
Figure 14A:
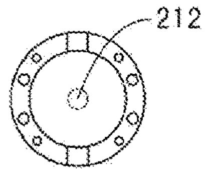
FIGS. 14A to 14H are front views and top views illustrating cores of the temperature calibration block in the same temperature calibration device.
Figure 14B:
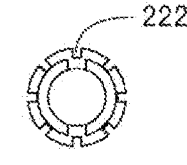
Figure 14C:
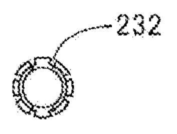
Figure 14D:
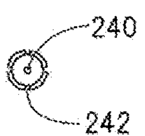
Figure 14E:
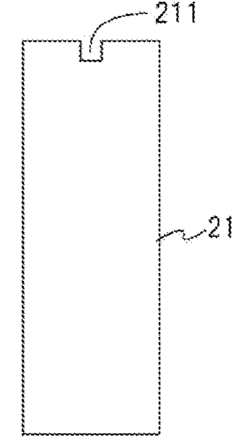
Figure 14F:
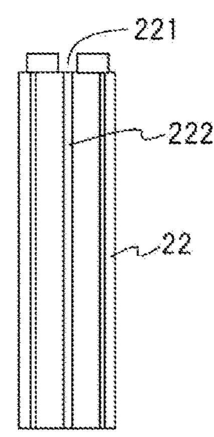
Figure 14G:
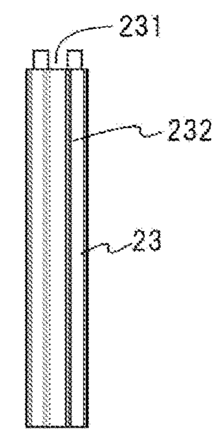
Figure 14H:
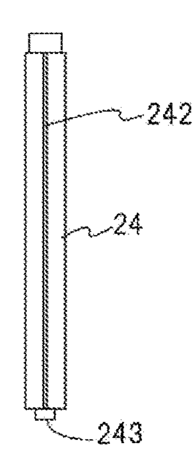
Figure 15A:
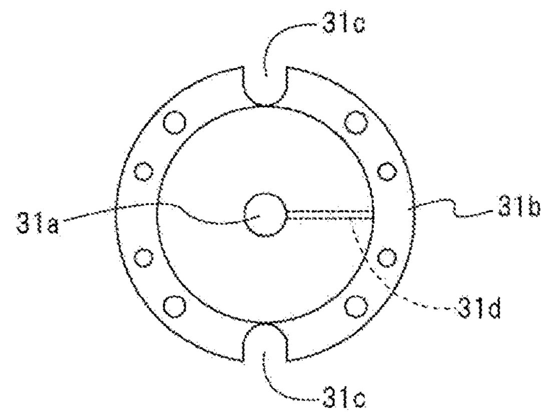
FIG. 15A is a top view illustrating a Peltier holder (lower holder) in the same temperature calibration device.
Figure 15B:
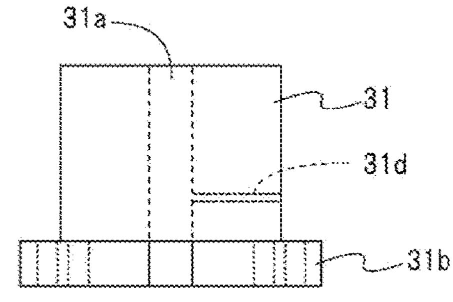
FIG. 15B is a front view illustrating the Peltier holder (lower holder) in the same temperature calibration device.
Figure 16A:
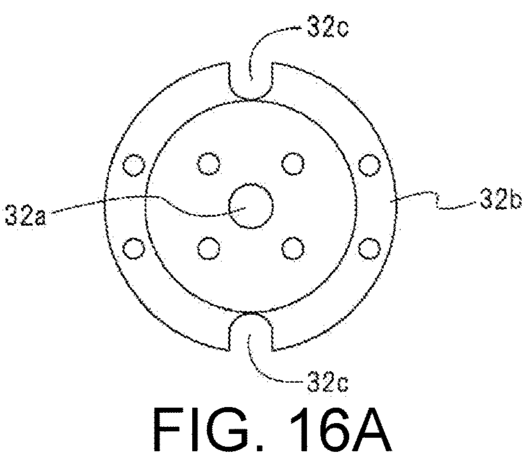
FIGS. 16A and 16B are respectively a top view and a front view similarly illustrating a Peltier holder (upper holder).
Figure 16B:
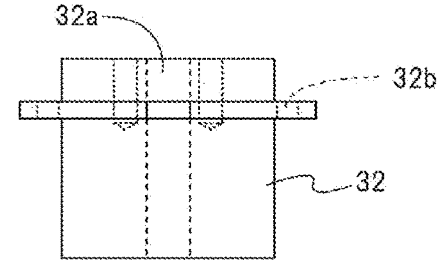
Figure 17:
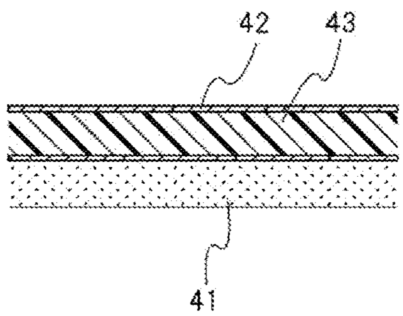
FIG. 17 is a schematic cross-sectional view illustrating a heat insulator.
Figure 18:
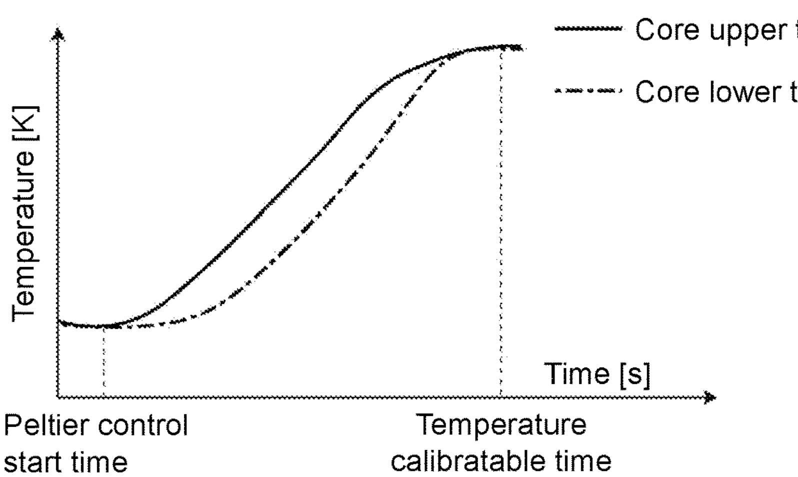
FIG. 18 is a graph illustrating a temperature distribution of the temperature calibration block in the same temperature calibration device.

In the following, a temperature calibration device for suitably realizing the temperature calibration method according to the embodiment is described with reference to FIGS. 7 to 18. FIGS. 7 and 8 are a perspective view and an exploded perspective view illustrating the temperature calibration device. FIGS. 9 and 10 are a perspective view and an exploded perspective view illustrating that the temperature calibration block and the Peltier module are removed. FIG. 11 is an exploded perspective view illustrating the temperature calibration block. FIG. 12A is a top view illustrating the same temperature calibration device, and FIG. 12B is a longitudinal cross-sectional view illustrating the same temperature calibration device. FIGS. 13A to 13C are lateral cross-sectional views illustrating the temperature calibration device. FIGS. 14A to H are front views and top views illustrating cores of the temperature calibration block. FIG. 15A is a top view illustrating a Peltier holder (lower holder) in the same temperature calibration device, and FIG. 15B is a front view illustrating the Peltier holder (lower holder) in the same temperature calibration device. FIGS. 16A and 16B are respectively a top view and a front view similarly illustrating a Peltier holder (upper holder) FIG. 17 is a schematic cross-sectional view illustrating a heat insulator. FIG. 18 is a graph illustrating a temperature distribution of the temperature calibration block in the temperature calibration device.

In the respective figures, the wiring relationships of lead wires, etc., are omitted and not illustrated. In addition, the same or corresponding portion may be labeled with the same symbol, and repetitive description may be omitted.

Firstly, the fundamental configuration of the temperature calibration device is described with reference to FIGS. 7 to 11. The temperature calibration device according to the embodiment is a device that compares and calibrates temperature by using a reference thermometer as the reference temperature sensor and a thermistor as the temperature sensor to be calibrated. A reference thermometer 5 is a platinum resistance thermometer calibrated according to the method specified by the International Temperature Scale (see FIG. 12B). In addition, the thermistor is a thin-film thermistor, for example.

The temperature calibration device 10 as shown in FIGS. 7 and 8 includes a vacuum-insulated container 1, a temperature calibration block 2 accommodated in the vacuum-insulated container 1, and a Peltier module 3 as the temperature control part. The temperature calibration device 10 is in a substantially cylindrical shape with a diameter dimension of φ 150 mm and a height dimension of about 360 mm.

The vacuum-insulated container 1 forms the appearance of the temperature calibration device 10, is formed in a substantially cylindrical shape by using a thin material of stainless steel, and has an outer cylindrical part 11 and an inner cylindrical part 12.

The outer cylindrical part 11 is formed by an outer circumferential sidewall 11*a*, a bottom wall 11*b* having a circular shape and forming a bottom surface of the outer circumferential sidewall 11*a*, and an upper wall 11*c* having a ring shape and forming an upper surface of the outer circumferential sidewall 11*a*. The inner cylindrical part 12 is in a bottomed tubular shape, and is formed by an outer circumferential sidewall 12*a* and a bottom wall 12*b* having a circular shape and forming a bottom surface of the outer circumferential sidewall 12*a*. An opening 12*c* having a circular shape is formed at the upper part of the inner cylindrical part 12. In the inner cylindrical part 12, an edge part of the opening part 12*c* is bonded to the ring-shaped upper wall 11*c* of the outer cylindrical part 11 through welding, etc.

Therefore, with the outer cylindrical part 11 and the inner cylindrical part 12, a closed space area, that is, a vacuum region Va, is formed on the outer circumferential side of the inner cylindrical part 12. On the upper side of the outer cylindrical part 11, a vacuum flange 11*d* is formed as a connection port connected with a vacuum pump. With the vacuum pump being connected with the vacuum flange 11*d* and operated, the vacuum region Va can become vacuum. In the vacuum region Va, a heat insulator to be described afterwards is arranged.

The temperature calibration block 2 and the Peltier module 3 thermally coupled to the temperature calibration block 2 are inserted, in a linked state, into the inner cylindrical part 12. Specifically, a member 230 to which the temperature calibration block 2 and the Peltier module 3 are linked is inserted and placed from the opening part 12*c* of the inner cylindrical part 12 toward the bottom wall 12*b*.

In addition, a ceiling 13 is linked and fixed to the member 230. Therefore, the temperature calibration block 2, the Peltier module 3, and the ceiling 13 are integrally linked by a fixing part, such as a screw, and thermally coupled.

The ceiling 13 is in a substantially circular shape, formed of a material having a favorable thermal conductive property, such as aluminum alloy, and placed on the upper surface of the vacuum-insulated container 1. In addition, a pair of take-out handles 13*a* formed in a substantially C shape are provided on the ceiling 13, and a wiring outlet hole, etc., to be described afterwards is also formed on the ceiling 13.

Therefore, the inner cylindrical part 12 forms an accommodation part accommodating the temperature calibration block 2 in the vacuum-insulated container 1, and, by operating the take-out handles 13*a*, the temperature calibration block 2 can be inserted into and accommodated in the accommodation part, that is the inner cylindrical part 12, or removed from the accommodation part.

Referring to FIGS. 9 to 11, the temperature calibration block 2 is formed of a material having a high thermal conductivity and a favorable thermal conductive property, arranged with the reference thermometer as the reference temperature sensor and the thermistor as the temperature sensor to be calibrated, and is a block maintained at a constant temperature.

Specifically, the temperature calibration block 2 as represented and shown in FIG. 11 includes multiple cores, i.e., a first metal core 21, a second metal core 22, a third metal core 23, and a fourth metal core 24. Each of the metal cores 21 to 24 is formed in a substantially cylindrical shape differing in diameter dimension, and is formed of a material with a favorable thermal conductive property, such as copper, aluminum, etc. The second metal core 22 is inserted into the inner diameter of the first metal core 21, the third metal core 23 is inserted into the inner diameter of the second metal core 22, and the fourth metal core 24 is inserted into the inner diameter of the third metal core 23. Accordingly, the temperature calibration block 2 is formed. That is, the temperature calibration block 2 includes multiple cores having a substantially cylindrical shape and differing in diameter dimension, and has a configuration in which a core on the inner sider is inserted into the inner diameter of a core on the outer side.

The Peltier module 3 is a module having a Peltier element that is a thermoelectric element. The Peltier element is a semiconductor element which makes use of the Peltier effect and in which, through flowing of a DC current, a surface serves as a heat absorption surface and the other surface serves as a heat discharge surface. By reversing the current direction, the heat absorption surface and the heat discharge surface are reversed. The Peltier module 3 is in a round shape and has a through hole 3*a* having a circular shape in the substantially central part, and a lead wire not shown herein is led out.

Such Peltier module 3 is sandwiched and held by a lower holder 31 and an upper holder 32 that are Peltier holders, and is installed to the side of the temperature calibration block 2. The lower holder 31 and the upper holder 32 are formed of a material having a favorable thermal conductive property, such as an aluminum material, has a flange part, and is formed in a short cylindrical shape.

In the lower holder 31, an upper surface is formed in a shape substantially the same as the surface of the Peltier module 3, a through hole 31*a* having a circular shape is formed in the substantially central part, and a flange part 31*b* is formed on a lower surface side. In addition, the flange part 31*b* is formed with a screw hole or a through hole for installing and coupling the lower holder 31 to the side of the temperature calibration block 2.

In the upper holder 32, a lower surface is formed in a shape substantially the same as the surface of the Peltier module 3, a through hole 32*a* having a circular shape is formed in the substantially central part, and a flange part 32*b* is formed on an upper surface side. In addition, at the flange part 32*b*, a through hole penetrated through by an installation screw $S_L$ for sandwiching the Peltier module 3 between the upper holder 32 and the lower holder 31 and installing and coupling the upper holder to the side of the temperature calibration block 2. On the upper surface and the lower surface of the lower holder 31, a heat transfer body $H_t$ may be provided. Specifically, the heat transfer body $H_t$ is heat transfer grease such as modified silicone, and may be formed by a filler of metal or metal oxide having a high thermal conductivity mixed with heat transfer grease. Accordingly, the bonding surface between the Peltier module 3 and the lower holder 31 is formed, and the heat of the Peltier module 3 can be efficiently transferred from the lower holder 31 to the temperature calibration block 2.

In addition, the temperature calibration block 2, the Peltier module 3, and the ceiling 13 are mechanically linked and thermally coupled, as represented and shown in FIGS. 7 and 8. Therefore, by holding and operating the take-out handles 13*a* described above, the temperature calibration block 2 can be inserted into and accommodated by the accommodation part of the vacuum-insulated container 1 and can be taken out from the accommodation part. In addition, the heat generated from the Peltier module 3 is transferred toward the upper surface side of the temperature calibration block 2 via the lower holder 31, and is discharged toward the side of the ceiling 13 via the upper holder 32.

In addition, the temperature calibration block 2 is accommodated in the vacuum-insulated container 1 to be surrounded by the vacuum region Va of the vacuum-insulated container 1. Therefore, the temperature calibration block 2 is held in a highly insulated state.

Then, the detailed configuration of the temperature calibration device is described with reference to FIG. 12A to FIG. 18.

As shown in FIGS. 12A and 12B and FIGS. 13A to 13C, the inner cylindrical part 12 of the vacuum-insulated container 1 forms the accommodation part accommodating the temperature calibration block 2, and the vacuum region Va is formed on the outer periphery of the accommodation part (inner cylindrical part 12). In addition, inside the vacuum region Va, more specifically between the outer circumference of the inner cylindrical part 12 and the inner circumference of the outer cylindrical part 11, a heat insulator 4 is provided to cover the inner cylindrical part 12 of the accommodation part.

The heat insulator 4 is capable of high-performance radiation shield. As shown in FIG. 17, for example, the material of the heat insulator 4 is formed by laminating a radiation layer 43 having a reflective layer 42 in which aluminum is deposited on both surfaces on a base material layer 41 of non-woven fabric. The radiation layer 43 is a resin layer, and is formed by polyester resin, etc. The thickness dimension of the base material layer 41 is about 7 μm to 11 μm, the thickness dimension of the radiation layer 43 is about 9 μm to 15 μm, and the layer thickness dimension is about 16 μm to 26 μm.

The material is sheet-like, has a flexible property, and is tape-like, and forms a shape suitable for the vacuum region Va, etc., and is arranged to stack multiple layers, more specifically 10 to 20 layers, and wrap around and cover the inner cylindrical part 12. In order to effectively exert the ability of radiation shield, the side of the radiation layer 43 may be placed to face the side of the inner cylindrical part 12.

The ceiling 13 is placed to contact the upper surface of the vacuum-insulated container 1. In the substantially central part of the ceiling 13, an insertion port 13*b* for the reference thermometer 5 and a wiring outlet hole 13*c* for taking out the wiring of the thermistor are formed. The insertion port 13*b* of the reference thermometer 5 may also serve as the wiring outlet hole of the thermistor for controlling the temperature of the Peltier module 3 to be described afterwards.

With reference to FIGS. 14A to 14H as well, the temperature calibration block 2 is formed by the first metal core 21, the second metal core 22, the third metal core 23, and the fourth metal core 24. The metal cores 21, 22, 23, 24 are substantially cylindrically shaped, and a placement part 25 is formed, the placement part 25 being elongated in the axial direction of the reference thermometer 5 as the reference temperature sensor and the thermistor as the temperature sensor to be calibrated.

The first metal core 21 is in a bottomed, hollow cylindrical shape. In the first metal core 21, a pair of narrow wiring outlet grooves 211 facing each other and having a small area are formed at the upper end, and a concave part 212 for positioning the fourth metal core 24 is formed at the bottom. The wiring outlet groove 211 mainly serves as a path for taking out the wiring of the lead wire, etc., of the thermistor as the temperature sensor to be calibrated.

The second metal core 22 is in a hollow cylindrical shape. In the second metal core 22, a pair of narrow wiring outlet grooves 221 facing each other and having a small area are formed at the annular-shaped upper end, and multiple insertion grooves 222 are formed from the top to the bottom in the axial direction on the outer circumferential part.

Specifically, eight insertion grooves 222 are formed at equal intervals of 45° on the circumference. The diameter dimension of the outer circumference of the second metal core 22 is substantially equal to the diameter dimension of the inner circumference of the first metal core 21, and the second metal core 22 is inserted into and in close contact with the inner circumference of the first metal core 21. Therefore, with the insertion grooves 222 of the second metal core 22 and the inner circumferential wall of the first metal core 21, a placement part 251 for the thermistor is formed (see FIG. 13C).

The third metal core 23 is also in a hollow cylindrical shape. In the third metal core 23, a pair of wiring outlet grooves 231 facing each other are formed at the annular-shaped upper end, and multiple insertion grooves 232 are formed from the top to the bottom in the axial direction on the outer circumferential part. Eight insertion grooves 232 are formed at equal intervals of 45° on the circumference. The diameter dimension of the outer circumference of the third metal core 23 is substantially equal to the diameter dimension of the inner circumference of the second metal core 22, and the third metal core 23 is inserted into and in close contact with the inner circumference of the second metal core 22. Therefore, with the insertion grooves 232 of the third metal core 23 and the inner circumferential wall of the second metal core 22, a placement part 252 for the thermistor is formed.

The fourth metal core 24 is substantially in a solid cylindrical shape. In the fourth metal core 24, an insertion port 240 is formed at the central part from the upper end to the bottom, and multiple insertion grooves 242 are formed from the top to the bottom in the axial direction on the outer circumferential part. The insertion port 240 serves as a placement part 250 for the reference thermometer 5. Four insertion grooves 242 are formed at equal intervals of 90° on the circumference. The diameter dimension of the outer circumference of the fourth metal core 24 is substantially equal to the diameter dimension of the inner circumference of the third metal core 23, and the fourth metal core 24 is inserted into and in close contact with the inner circumference of the third metal core 23. Therefore, with the insertion grooves 242 of the fourth metal core 24 and the inner circumferential wall of the third metal core 23, a placement part 253 of the thermistor is formed. In addition, a convex part 243 is formed at the bottom of the fourth metal core 24, and is fit with a positioning concave part of the first metal core 21 to be positioned.

In the above configuration, the relative relationship of the multiple cores, that is, the first metal core 21, the second metal core 22, the third metal core 23, and the fourth metal core 24, is a relationship in which the outer circumferential wall of the cylindrical core on the inner side is in contact with the inner circumferential wall of the hollow, cylindrical core on the outer side, and the placement part 25 of the temperature sensor to be calibrated is formed by the insertion grooves of the core on the inner side and the inner circumferential wall of the core on the outer side.

In addition, as represented and shown in FIG. 13C, the insertion ports of the placement parts 251, 252, and 253 for the respective thermistors have different size. Therefore, it is possible to arrange temperature sensors to be calibrated, such as thermistors, etc., of different types and sizes.

In addition, the insertion port 240 of the fourth metal core 24 is continuous with the through hole 31*a* of the lower holder 31 of the Peltier module 3, the through hole 3*a* of the Peltier module 3, the through hole 32*a* of the upper holder 32, and the insertion port 13*b* of the ceiling 13 to render a penetration state, and the reference thermometer 5 can be placed from the insertion port 13*b* of the ceiling 13 toward the insertion port 240 of the fourth metal core 24.

Moreover, since the wiring such as the lead wire of the thermistor as the temperature sensor to be calibrated is taken out from the respective wiring outlet grooves 211, 221, and 231, heat can be suppressed from entering temperature calibration block 2 from the thermistor through the wiring.

The Peltier module 3 is sandwiched by the lower holder 31 and the upper holder 32 as described above, and is installed to the side of the temperature calibration block 2. As shown in FIG. 15A, in the flange part 31*b* of the lower holder 31, a pair of notches 31*c* facing each other and open toward the outer side are formed. The notch 31*c* serves as a path for the wiring of the thermistor as the temperature sensor to be calibrated to pass through. In addition, in the lower holder 31, an arrangement hole 31*d* in which a thermistor (not shown) for temperature control of the Peltier module 3 is formed. The arrangement hole 31*d* is formed from the outer circumference toward the central part until the through hole 31*a*. The temperature control thermistor serves to sense the temperature of the Peltier module 3 and control the temperature of the Peltier module 3 to the predetermined temperature.

As shown in FIG. 16A, in the flange part 32*b* of the upper holder 32, a pair of notches 32*c* facing each other and open toward the outer side are formed also as a path for the wiring of the thermistor to pass through.

In the following, an order (temperature calibration method) of using the temperature calibration device 10 is described mainly with reference to FIGS. 12A and 12B. Firstly, it is assumed that the vacuum region Va of the vacuum-insulated container 1 has become vacuum. Also, the wiring led out from the temperature calibration device 10 is connected with the temperature calibration device 10, and the temperature calibration device 10 is connected with a control processing part, such as a microcomputer, executing control on the temperature calibration device 10.

(1) The take-out handles 13*a* of the ceiling 13 are held and operated, and the temperature calibration block 2 is taken out from the accommodation part of the vacuum-insulated container 1.

(2) The temperature calibration block 2 and the Peltier holder (the lower holder 31 and the upper holder 32) are separated, and the thermistor of the temperature sensor to be calibrated and the reference thermometer 5 are placed at the temperature calibration block 2. Specifically, the thermistor of the temperature sensor to be calibrated is inserted into and placed at the arrangement 25 for the thermistor, and the reference thermometer 5 is inserted into and placed at the placement part 250. In this case, the temperature sensing part of the reference thermometer 5 and the temperature sensing part of the thermistor may be located at substantially the same position in the axial direction (vertical direction), and may be at the vicinity of the bottoms of the respective metal cores 21, 22, 23, and 24. In addition, a liquid, such as silicone oil, having an insulating property and favorable thermal conductive property, is filled into the placement part 25 and the placement part 250, and the temperature sensor to be calibrated and the reference thermometer 5 are inserted into the placement part 25 and the placement part 250. Accordingly, the internal temperatures of the placement part 25 and the placement part 250 become equal, and the temperature calibration accuracy can be enhanced.

(3) The Peltier holder is fixed to the temperature calibration block 2, and the temperature calibration block 2 is accommodated in the accommodation part of the vacuum-insulated container 1 again.

(4) The Peltier module 3 is heated and the temperature is increased to the predetermined temperature.

(5) By heating of the Peltier module 3, in the temperature state in the gradual temperature increasing transition process before the temperature calibration block 2 reaches the predetermined temperature (thermal equilibrium), a quasi-equilibrium state is set as a calibration temperature, and multiple temperature points are captured.

(6) The data of the relationship between the temperature calibration block 2 (the reference thermometer 5) and the thermistor of the temperature sensor to be calibrated, that is, the correlation relationship between the temperature (calibration temperature) of the reference thermometer 5 and the resistance value of the thermistor, is acquired. Afterwards, the heating temperature of the Peltier module 3 may be controlled again, and the temperature calibration block 2, for example, may be controlled to different calibration temperatures in stages.

(7) The operation of (6) is repetitively performed, and a table of the temperatures of the reference thermometer 5 and the resistance values of the thermistor of the temperature sensor to be calibrated, that is, a calibration curve, is generated, and temperature calibration is performed. According to the embodiment, by using a simple configuration, the temperature calibration accuracy can be enhanced, and it is possible to efficiently perform temperature calibration.

Specifically, since the Peltier module 3 is used, the heat from the Peltier module 3 is transferred to the upper surface of the temperature calibration block 2 via the lower holder 31, and the control for achieving a temperature distribution able to calibrate the temperature calibration block 2 can be achieved by using a simple configuration in a short time. Moreover, even in the case where the calibration temperature is lower or higher than the ambient temperature, the temperature distribution inside the temperature calibration block 2 can be significantly reduced.

Moreover, since the temperature calibration block 2 is surrounded by the vacuum region Va of the vacuum-insulated container 1, with the synergistic effect between the vacuum heat insulating property and the heat insulating property due to the heat insulator 4, a high heat insulating property is secured, and it is possible to achieve the control for achieving the temperature distribution able to calibrate the temperature calibration block 2 within a short time.

In the reference thermometer 5 and the thermistor of the temperature sensor to be calibrated, with the placement part 25 axially elongated along the axial direction, the heat transfer coefficient of the outer circumference of the temperature calibration block 2 can be reduced to extremely small by using the vacuum region Va in the radial direction, and the Biot number of the temperature calibration block 2 is significantly reduced. Therefore, since the temperature distribution inside the temperature calibration block 2 is kept very homogeneous, it is possible to accurately perform temperature calibration on the temperature sensor to be calibrated.

As shown in FIG. 18, within a short time from the start of the control of the Peltier module 3, the temperatures of the upper part and the lower part of the temperature calibration block 2 can achieve the quasi-equilibrium state within a short time, and it is possible to perform temperature calibration within a short time.

In addition, since the temperature calibration block 2 can be controlled to different calibration temperatures in stages, it is possible to continuously perform temperature calibration of multiple temperatures through one temperature calibration operation.

Regarding the temperature calibration device, for example, the Peltier module is not limited to being round. A square shape of the Peltier may also be used. Moreover, although it is possible to perform temperature calibration by using the method of the embodiment at around room temperature, in the temperature calibration under a lower temperature, it is possible to keep the temperature calibration block at a low temperature to perform temperature calibration at a low temperature through cooling the ceiling with a refrigerant, liquid nitrogen, etc.

Moreover, although the core forming the temperature calibration block may be of a metal material, resin may also be used, as long as the predetermined thermal conductivity can be secured. A material in which a highly thermally conductive filler is mixed with resin can also be used.

The invention is not limited to the embodiments described above, and various modifications can be made without departing from the gist of the invention. Further, the above embodiment is presented as an example, and is not intended to limit the scope of the invention. These novel embodiment can be implemented in various other forms, and various omissions, substitutions, and changes can be made. The embodiment and the modifications thereof are included within the scope and gist of the invention, as well as within the scope of the invention described in the claims and its equivalents.

What is claimed is:

1. A temperature calibration method, performed by a temperature calibration device comprising a temperature calibration block formed with a placement part for a reference temperature sensor and a temperature sensor to be calibrated, the temperature calibration method comprising:

setting a temperature state in a gradual temperature variation transition process of the temperature calibration block as a calibration temperature, wherein the temperature calibration block comprises a plurality of cores, the plurality of cores comprises an inner core and an outer core, each of the inner core and the outer core is cylindrical, a diameter of the inner core is different from a diameter of the outer core, and the inner core is inserted into an inner diameter of the outer core, wherein the inner core is in direct contact with an inner circumference of the outer core, and a diameter of an outer circumference of the inner core is the same as the inner diameter of the outer core.

2. The temperature calibration method as claimed in claim 1, wherein the temperature calibration device comprises: a vacuum-insulated container, which has a vacuum region to surround the temperature calibration block, and in which an accommodation part accommodating the temperature calibration block; and a Peltier module, thermally coupled with the temperature calibration block.

3. The temperature calibration method as claimed in claim 2, wherein a heat insulator is provided in the vacuum region.

4. The temperature calibration method as claimed in claim 3, wherein a material of the heat insulator has a flexible property and comprises a radiation layer, and form the heat insulator by stacking a plurality of layers.

5. The temperature calibration method as claimed in claim 1, wherein an insertion groove is formed in an axial direction on the outer circumference of the inner core, and by using the insertion groove and an inner circumferential wall of the outer core, the placement part for the temperature sensor to be calibrated is formed.

6. The temperature calibration method as claimed in claim 5, wherein a plurality of placement parts for the temperature sensor to be calibrated are formed, and insertion ports of the placement parts are different in size.

7. The temperature calibration method as claimed in claim 1, wherein a wiring outlet groove is formed at an upper end of the outer core.

8. The temperature calibration method as claimed in claim 1, wherein in a state in which the reference temperature sensor and the temperature sensor to be calibrated are placed in the placement part of the temperature calibration block, a temperature sensing part of the reference temperature sensor and a temperature sensing part of the temperature sensor to be calibrated are located at substantially a same position in an axial direction.

9. The temperature calibration method as claimed in claim 2, wherein, in the Peltier module, a through hole is formed at a substantially central part.

10. The temperature calibration method as claimed in claim 2, wherein the Peltier module is held by a Peltier holder, and heat from the Peltier module is transferred to the temperature calibration block via the Peltier holder.

* * * * *